INVENTOR
PHILIP A. FLOURNOY

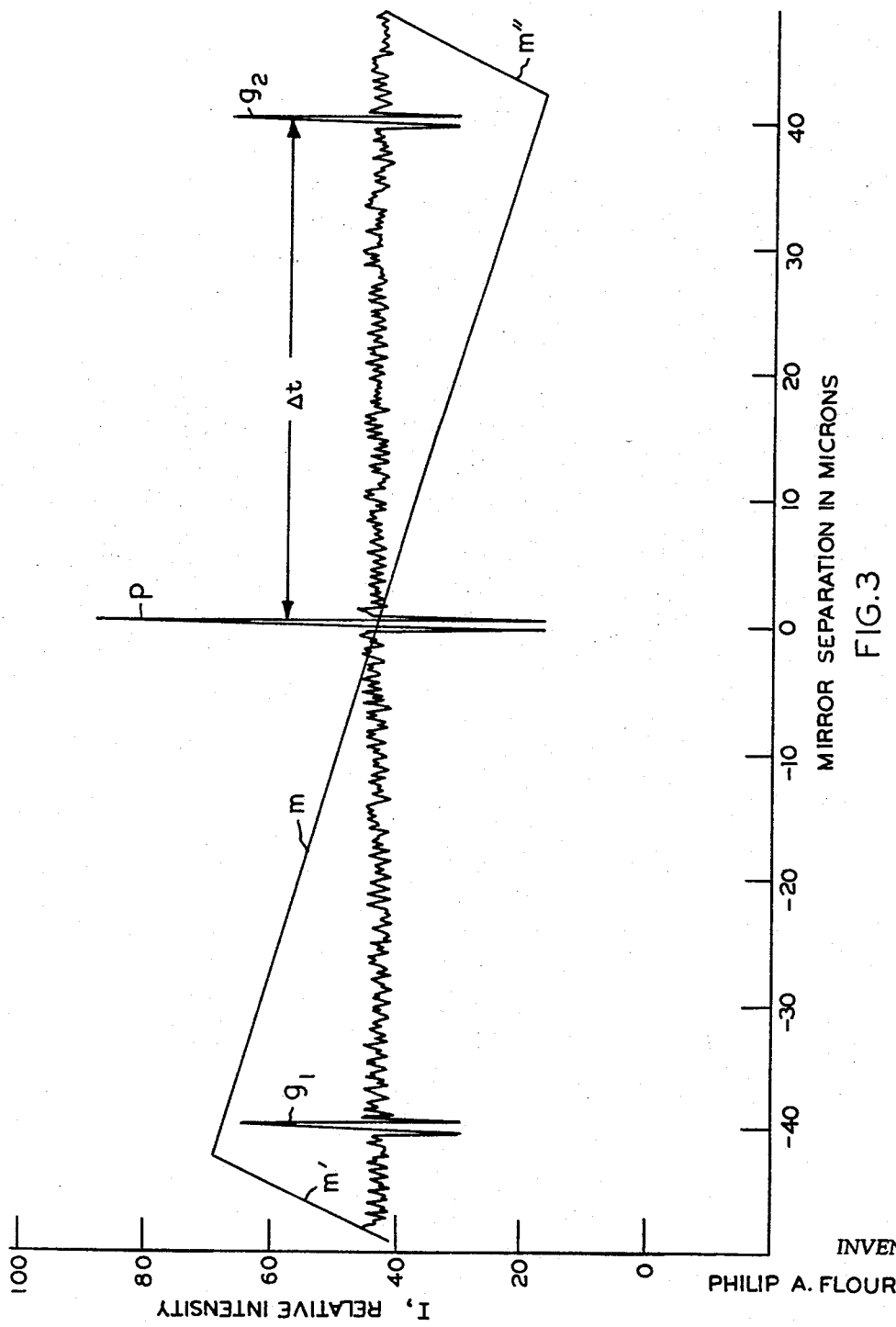

May 16, 1967 P. A. FLOURNOY 3,319,515
INTERFEROMETRIC OPTICAL PHASE DISCRIMINATION APPARATUS
Filed Aug. 27, 1963 5 Sheets-Sheet 5
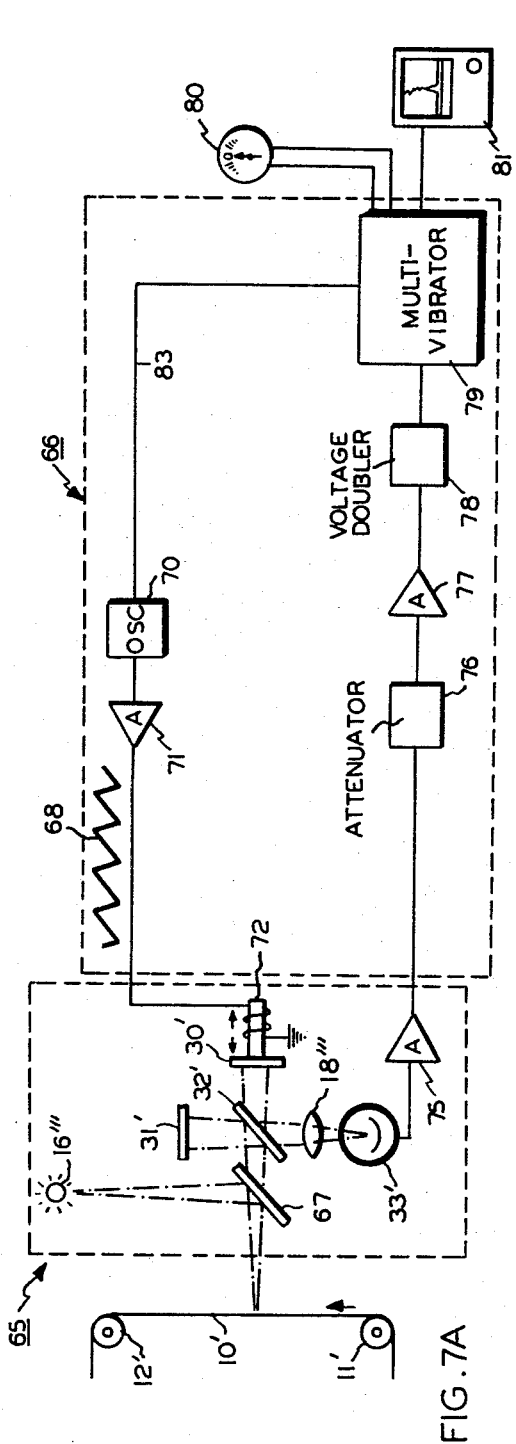
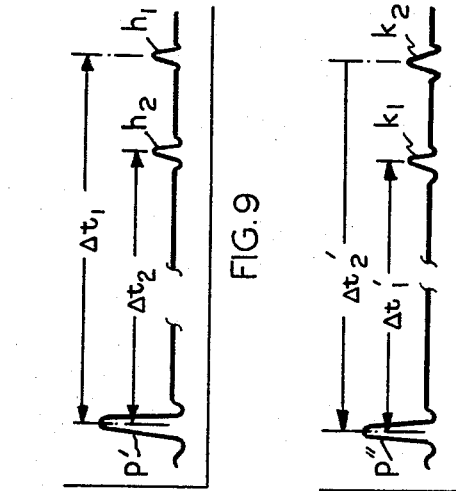
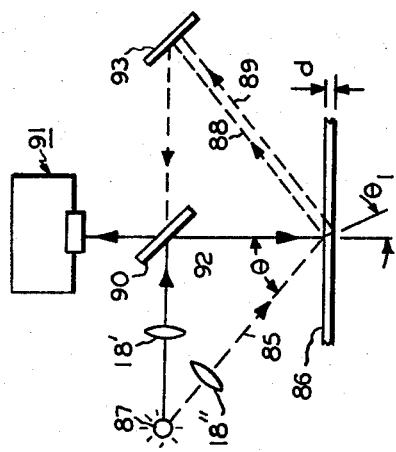
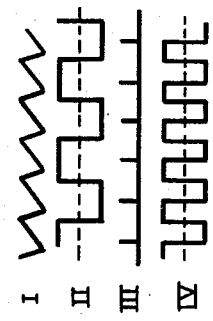
INVENTOR
PHILIP A. FLOURNOY
BY *Harry J. McCauley*
ATTORNEY United States Patent Office 3,319,515
Patented May 16, 1967

3,319,515
INTERFEROMETRIC OPTICAL PHASE
DISCRIMINATION APPARATUS
Philip A. Flournoy, Wilmington, Del., assignor to E. I.
du Pont de Nemours and Company, Wilmington, Del.,
a corporation of Delaware
Filed Aug. 27, 1963, Ser. No. 304,849
7 Claims. (Cl. 88—14)

This invention relates to interferometric examination, and particularly to a method and apparatus for the determination of a physical property of a specimen on the basis of interferometric optical phase discrimination.

A number of physical properties of light-reflective and transmissive substances can be measured by radiation interferometric procedures; however, the methods and apparatus heretofore evolved have been cumbersome in use and require skilled human manipulation for accuracy in the results obtained, so that they have not come into very widespread use. Thus, optical thickness gages of the type disclosed in U.S. Patents 2,518,647, 2,578,859 and 2,655,074 have a restricted application in the leisurely measurement of film thickness by trained personnel conducted on a limited number of samples, such as might be processed in a control laboratory or the like, but that is about the practical limit of their utlity.

There is a clear need for accurate, wide range, rugged, plant-type apparatus for high-speed thickness gaging of running film in the course of its modern manufacture, as there is also for apparatus adapted to measure by refringence, density, refractive index, the uniformity of application of exceedingly thin surface coatings on films such as cellophane and similar materials, or other physical properties, and this invention constitutes an improvement in this art. Other objects include the provision of a highly accurate, compact, relatively simple method and apparatus for interferometric specimen examination which is readily automated and which can be used for a wide variety of material examinations as an aid in the better understanding and control of process operations.

Figure 1:
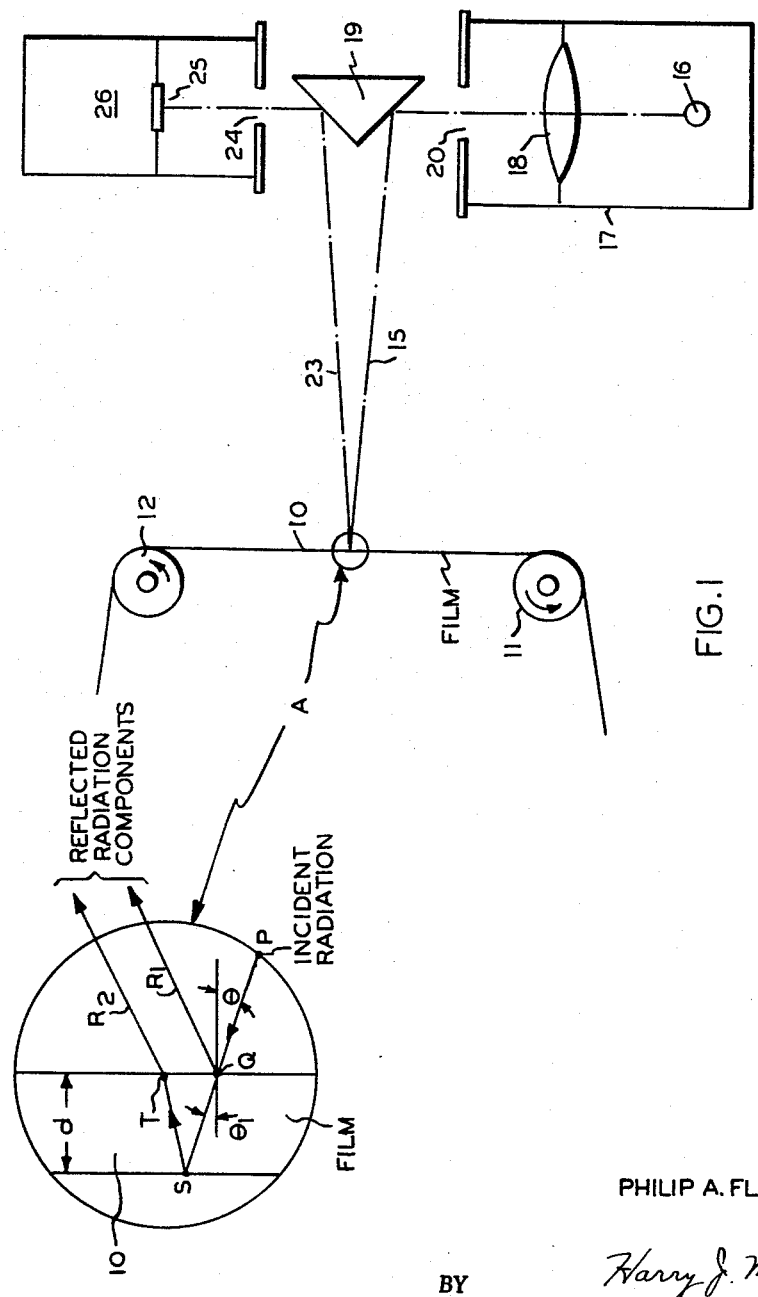
Figure 4:
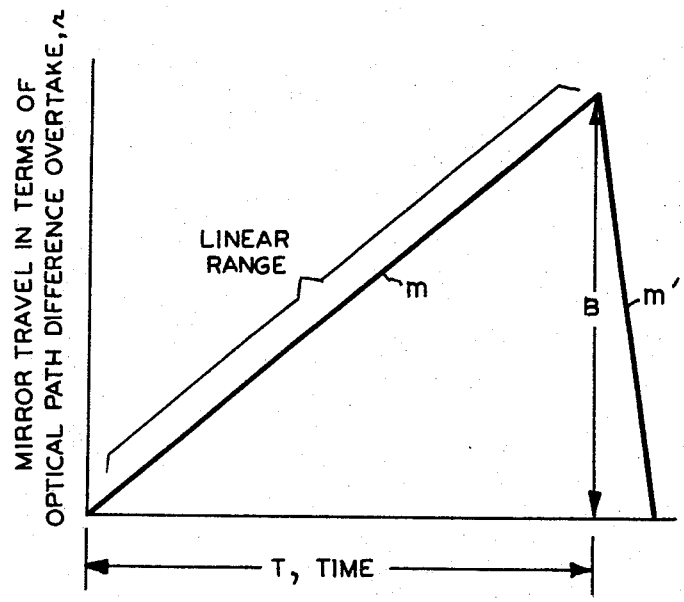
Figure 2:
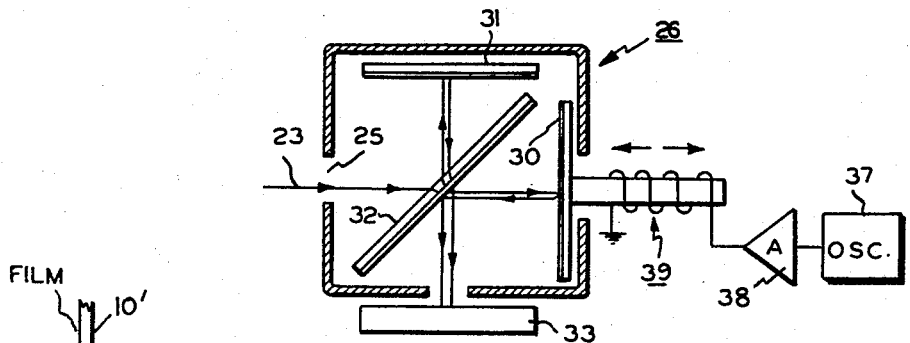
Figure 5:
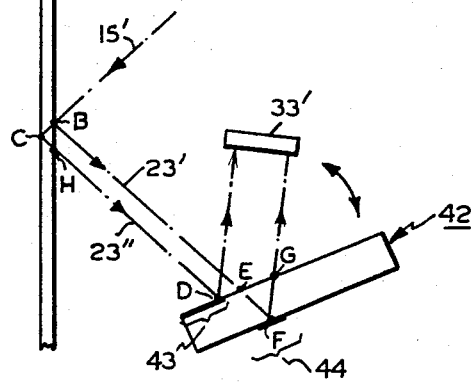
Figure 6A:
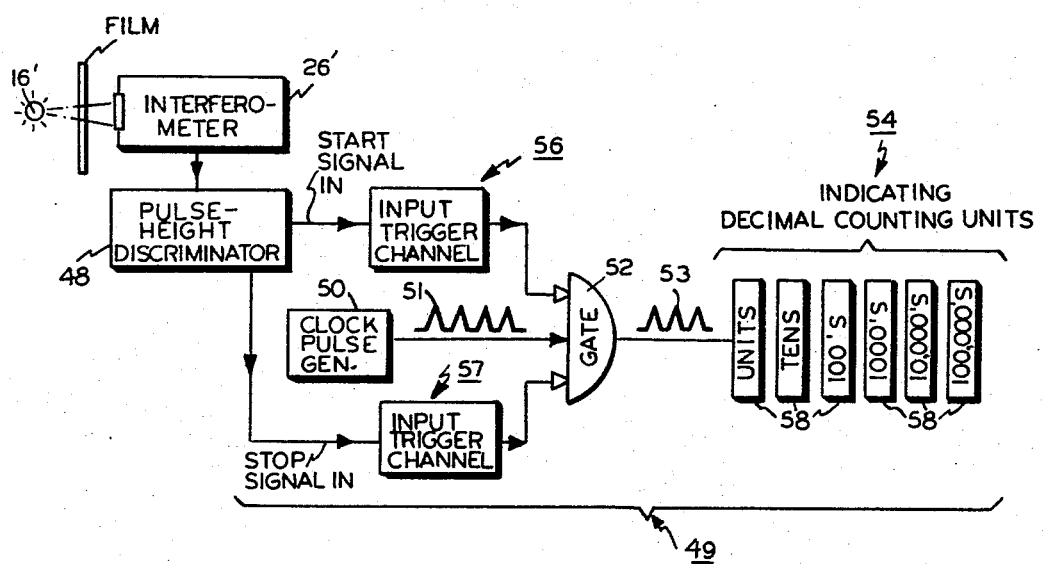
Figure 6B:
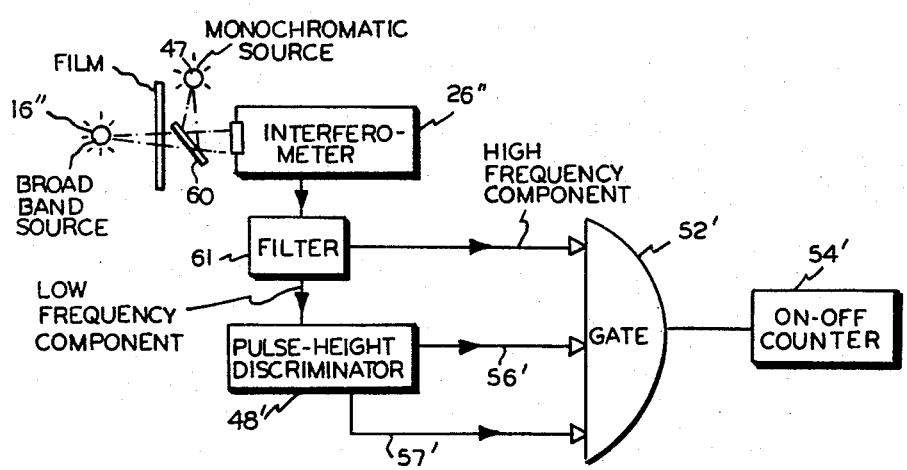

The manner in which these and other objects of this invention are attained will become clear from a study of the detailed film examination description which follows, taken together with the following drawings, in which:

FIG. 1 is a schematic representation of a preferred arrangement of optical equipment utilized in the gaging of a running film, the site of radiation impingement on the film being shown as an enlarged inset view, A, drawn at the bottom of the page, FIG. 2 is a schematic representation of a reciprocatory reflector type Michelson interferometer which can be used for the development of interference indicia employed in measurement of film gage according to this invention, FIG. 3 is an interferogram representative of the distinctive interference fringe traces obtained on either side of the central zero-order peak p obtained for the condition of equal-length interferometric arms in the apparatus of FIGS. 1 and 2, the translational time-space course of reciprocatory mirror movement being superposed to indicate its relationship to the radiation interference indicia developed in one type of operational scan of the apparatus, FIG. 4 is a schematic representation of the time-mirror travel relationship in terms of optical path difference overtake r, for the reciprocatory mirror of the interferometic apparatus of FIG. 2, FIG. 5 is a schematic representation of a second design of optical apparatus for the practice of this invention, FIGS. 6A and 6B are schematic representations of two different embodiments of apparatus according to this invention operating in the radiation-transmissive mode and utilizing on-off pulse counters for time interval measurement, FIG. 7A is a schematic representation of an embodiment of apparatus according to this invention adapted to measure variation from nominal gage of a running film, FIG. 7B is a schematic representation of the four electrical signal wave forms employed in the apparatus of FIG. 7A, FIG. 8 is a schematic representation of a preferred embodiment of optical apparatus for the determination of refractive index, FIG. 9 is a diagrammatic interferogram representative of the interference fringe traces obtained in a single interferometer scan of the apparatus of FIG. 8, and FIG. 10 is a diagrammatic interferogram representative of the interference fringe traces relied upon for measurement of birefringence according to this invention.

Generally, this invention comprises a method for determining a physical property of a specimen on the basis of interferometric optical phase discrimination comprising, in sequence, viewing the specimen with analytical radiation along a course such that there is developed an optical phase difference between radiation emanating from a first radiation-reflective surface of the specimen and from a second radiation-reflective surface of the specimen, cyclically varying at a predetermined time rate the length of the path of travel of the radiation emanating from a given one of the pair consisting of the first radiation-reflective surface of the specimen and the second radiation-reflective surface of the specimen with respect to the length of the path of travel of the radiation emanating from the other of the pair over a span inclusive of a zero-order peak at which there exists constructive interference between the radiation emanating from the first radiation-reflective surface of the specimen and from the second radiation-reflective surface of the specimen, measuring the elapsed time existing between the scan traverse of the zero-order peak at which there exists said constructive interference and a preselected reference point synchronized in time with the cycle of scan traverse, and determining the physical property of the specimen as a function of the elapsed time, together with apparatus for carrying out the method.

Referring to FIG. 1, a preferred embodiment of this invention employed in film thickness gaging can operate in the open on reflected radiation, making it possible to mount the entire apparatus on a single side of the film in process, although operation in the transmissive mode is entirely feasible, as hereinafter described with respect to FIGS. 6A and 6B particularly. Thus, the film, denoted at 10, trained over guide rolls 11 and 12, can be viewed with a small beam of analytical radiation 15 in the course of its running travel over the guide rolls, an upward direction of film travel being arbitrarily shown in this view. Typically, the film speed is about 120 yards/min., and, for a clear cellophane film in the range of 0.1 to 15 mils thickness, for example, the analytical radiation can be a beam of light in the near-infrared region, i.e., in the 1–3 micron range. Interferences in gage measurement occasioned by film whipping are effectively eliminated by viewing the film with the analytical radiation input at near-normal incidence.

The radiation source 16 can typically be a 35 w. tungsten-filament incandescent lamp operating from a 6 v. D.-C. power supply, not shown. Source 16 is mounted within a light-tight housing 17 provided with a double-convex glass focusing lens 18 in line with an aperture 20, so that a 1:1 image of the hot filament of light source 16, measuring about ¼″ x ⅛″ in size, is projected on the film plane via radiation-directing silvered prism 19.

As shown in enlarged section in inset A, incident radiation 15 impinges on the front radiation-reflective surface of film 10, from whence a portion is reflected along a course $R_1$, whereas the bulk of the remainder is transmitted through the film, being characteristically refracted during the transit as shown. This transmitted radiation in due course encounters the back radiation-reflective surface of film 10 and part is returned towards the front surface, again with the characteristic refraction, finally leaving along a course $R_2$. The exit radiation from the sample, inclusive of that traveling both of the paths $R_1$ and $R_2$, is denoted collectively at 23, which is conveniently returned to the other face of prism 19 and reflected therefrom through aperture 24 into the input port 25 of an interferometer, indicated generally at 26.

For purposes of description, the specific interferometer used in this embodiment of the invention can be of the Michelson type shown schematically in FIG. 2, except that one radiation-reflective mirror thereof, in this instance arbitrarily chosen as mirror 30, is reciprocated cyclically through a span hereinafter detailed, whereas the other radiation reflective mirror 31, is maintained fixed in position. As is conventional, the interferometer embodies an inclined radiation reflecting-transmitting beam splitter 32 (typically, a ¼″ thick semireflective glass plate partially mirrored on the underside, disposed at an angle of 45° with respect to mirrors 30 and 31) which delivers the input radiation in approximately equal-intensity portions to each of the mirrors 30 and 31 from whence the beams are reflected back to beam splitter 32 as indicated by the arrow heads, being then directed outwardly in close adjacency and made to impinge on a photoelectric detector 33, which in this case can be of the lead sulphide type. The design of interferometer described is the subject matter of copending U.S. Application Ser. No. 120,600, now Patent No. 3,286,582, and comprises a saw-tooth oscillator 37 and associated electronic power amplifier 38, delivering cyclic saw-tooth voltage pulses to a solenoid-type electrodynamic motor indicated generally at 39, to thereby reciprocate mirror 30 at a frequency of, typically, 50 cycles/sec.

In operation, the general principles of interferometry are utilized as follows. The phase difference $a$, which exists as regards any two radiation beams of wavelength $\lambda$ in reaching a point of observation, such as detector 33, is a function of the optical path difference $b$, and can be expressed by the equation $$a = 2\pi b/\lambda \quad (1)$$

Where the two beams are in phase, there exists "constructive interference," which is evidenced by the development of localized high-intensity radiation regions or "fringes," whereas, where the two beams are out of phase, there is "destructive interference," or regions where the two beams cancel one another to an extent depending precisely on how far out of phase the radiation is.

Referring to inset A, FIG. 1, if the input radiation, PQ, impinges on the film at an angle $\theta$ measured from the normal, the first-reflected ray, $R_1$, upon which my film gage measurement is based leaves the front radiation-reflective surface of the film, whereas the remaining radiation enters the film (of thickness $d$) on a refracted course along angle $\theta_1$ to point S, located on the rear surface of film 10. A portion of this radiation is reflected back to point T on the front surface of the film along the refracted course ST, the second reflected ray upon which my measurement is based then emerging as $R_2$. If the film has a refractive index $n$, the optical path difference $b$ between $R_1$ and $R_2$ can be calculated as $b = 2nd \cos \theta_1$ (refer. p. 262, "Fundamentals of Optics" by Jenkins and White), from which the optical phase difference, using Equation 1, specifically applied, becomes $$a = \frac{2\pi}{\lambda}(2nd \cos \theta_1) \quad (2)$$

The intensities of illumination reflected as beams $R_1$ and $R_2$ are equal to a close approximation, whereupon the intensity $I$ of the two beams considered as a totality is, from pp. 211–213, reference supra, $$I = 4I_1 \cos^2 a/2 \quad (3)$$

Referring to FIG. 2, beam 23, made up of $R_1$ and $R_2$ together, is split into components which are reflected on the one hand to fixed mirror 31, and rereflected therefrom, and on the other hand to reciprocatory mirror 30, and rereflected therefrom, giving four separate wave trains within the interferometer.

In accordance with the principles of interferometry, when the path lengths from source to mirrors are equal, there is constructive interference for all wavelengths between the emergent reflected light from the mirrors. The points at which this condition exists are called zero-order peaks, and the central one of these is where the distance of mirror 30 from beam splitter 32 exactly equals the distance of mirror 31 from beam splitter 32 or, stated another way, where the arms of the interferometer are equal. At this central zero-order peak, point Q (Inset A, FIG. 1) on the front surface of the film is effectively the common source for the two split portions of beam $R_1$, which then constructively interfere one with the other, whereas point S, via point T, is another distinct common source for the two split portions of beam $R_2$, which then constructively interfere with one another to superadd their effect to the $R_1$ interference. The result is that the maximum radiation intensity zero-order peak is obtained as this central peak, as evidenced by the spike $p$ shown in the interferogram of FIG. 3. With a Michelson type interferometer, the central peak affords a convenient reference point from which elapsed time measurements can be made as hereinafter described, although it will be understood that any established reference point in time is equally practicable.

Now, if one of the mirrors 30, 31, in this case mirror 30, is moved relative to the other mirror so as to vary the length of light paths of input radiation 23, it will be seen that, at one point of leftward movement, i.e., at a distance equal to one-half the optical path difference, $b$, introduced by film 10 out of equality length of the interferometer arms, as viewed in FIG. 2, mirror 30 will shorten the path length of radiation $R_2$ emanating from the rear-reflective surface of film 10 via points S and T, so that there will be created another zero-order peak $g_1$, FIG. 3, at which the source path length will be brought into exact equality with the source path length of radiation $R_1$ emanating from point Q and reflected back to beam splitter 32 from mirror 31. This sideband peak, compared with central peak $p$, is of reduced intensity, because it lacks the superadded constructive interference contributed by the remaining two of the total of four radiation wave trains; nevertheless, it is clearly distingishable above the adjacent noise and incidental uninterpretable complex partial interference signal level, so as to constitute a second point in time upon which to predicate measurement according to this invention.

A second side-band peak of exactly the same amplitude as $g_1$, namely $g_2$, is brought into existence on the opposite side of central peak $p$ as a result of the same magnitude of rightward movement of mirror 30 with respect to beam splitter 32, because the path length of radiation $R_1$ to mirror 30 is then ultimately lengthened until it is brought into equality with $R_2$ radiation reflected back from mirror 31. Therefore, this third zero-order peak affords still another distinctive point in time with respect to either central peak $p$, side-band peak $g_1$ or, in fact any other convenient established reference point permitting measurement according to this invention.

Precise control of the translational movement of mirror 30 is, of course, necessary to accurate time measurements and a convenient drive is that provided by saw-tooth oscillator 37 of FIG. 2, which reciprocates the mirror along a time-distance path which is represented by the course line $m$ drawn in as an overlay on the interferogram of FIG. 3. This course line is represented as symmetrical ly disposed with respect to zero-order peak p for purposes of this description but it will be understood that there exists a wide choice in this regard. For simplicity in the time measurement of intervals such as Δt drawn between central peak p and side-band peak $g_2$, it is preferred to maintain the velocity of translation of mirror 30, i.e., the slope of course line m, constant throughout its scan of the corresponding distance interval, so that the brief mirror return periods, corresponding to terminal traces m' and m'', are deliberately disposed to left and right of sideband peaks $g_1$ and $g_2$, respectively.

Quantitatively, the intensity of radiation $I_f$ seen by photoelectric detector 33 can be expressed as a function of optical path difference overtake r as the product of the intensity distribution from the film and from the interferometer, summed over all of the existing frequencies, by the equation $$I_f(r) = I_o \Sigma_c \cos^2 \pi cb \cos^2 (\pi cr) \quad (4)$$

where $I_o$, the source of radiation, is assumed constant and $c = 1/\lambda$ is the wave number of the radiation employed. A plot of intensity of photoelectrically perceived radiation in the region of interest is that given by the interferogram of FIG. 3 already elaborated.

Analyzing the travel of mirror 30 throughout one-half of its course only, if the course line m is reproduced somewhat schematically, together with its associated terminal portion m', as shown in FIG. 4, time, plotted as the abscissa, is related to mirror 30 travel in terms of resulting optical path difference overtake r, as ordinate as depicted.

Assuming that one of the zero-order peaks $g_1$ (or $g_2$) occurs when mirror 30 is at the inflection ordinate B of its traverse course, the mirror travel between this peak and central zero-order peak p would need to be only $B/2$ since the light reflection path between beam splitter 32 and mirror 30 is a double-length course, extending, as it does, from the splitter to the mirror and back again. Thus, the constant velocity V of mirror 30 throughout the scan from central peak p to a given side-band peak, either $g_1$ or $g_2$, is $V = B/2T$, where T is the corresponding constant velocity time interval stepped off along the abscissa, and the rate of optical path difference overtake is then $B/T$.

The elapsed time interval Δt, between adjacent zero-order peaks is the optical path difference b, in the film divided by the rate of optical path difference overtake, $B/T$, so that, substituting from Eq. 1, $$\Delta t = \frac{2ndT \cos \theta_1}{B} \quad (5)$$

or, rearranging terms, d, the film thickness, is a function of elapsed peak-to-peak time, Δt, according to the relationship $$d = \frac{B(\Delta t)}{2nT \cos \theta_1} \quad (6)$$

Accordingly, determining the elapsed time, Δt gives a direct measure of film thickness d, subject of course, to the fact that mirror 30 must be at least as great as the maximum optical path in the film, unless the reference point chosen is predeterminedly displaced in a direction narrowing the analytical span, as is usually preferred, since cycle times can then be correspondingly reduced and a larger number of thickness gagings accomplished within a given period of time.

Another design of interferometer, adapted to produce only a single zero-order interference fringe, is that detailed in FIG. 5. Here the film 10' is viewed by input radiation 15' impinging on both the front and back radiation-reflective surfaces in the same manner as taught for FIG. 1, with reflection as output radiation indicated schematically as a first-reflected portion 23' and a second-reflected portion 23'', which are routed to a plane-surfaced optical plate 42.

Plate 42 is provided with a first light-reflective coating, such as vaporized aluminum or a similar material, over a limited expanse of the front face 43 interposed across the path of radiation 23'' solely, and with a second light-reflective coating 44 over a small expanse on the rear side of the plate interposed across the path of radiation 23' solely. Under these circumstances the two wave trains are redirected along courses which bring them into impingement on a radiation detector 33', which can be identical in design with detector 33 hereinbefore described.

The scan traverse of plate 42 is obtained by mounting the plate for oscillation around a pivot point D such that the length of path of one beam of reflected radiation, in this instance beam 23'', is maintained fixed. Whenever the angles of incidence of the radiation on the film and the plate are equal and the optical path differences BCH within film 10' and EFG for beam 23' within plate 42 are also equal, as occurs periodically during the cyclic oscillation of plate 42 around pivot D, a zero-order peak is obtained. The necessity for extreme precision in the mirror disposition on plate 42 can be lessened, if desired, by simply half-silvering the entire front mirror face and full-silvering the entire back face.

The reference point constituting the other of the two time interval indicia upon which measurement is based can then conveniently be any chosen point in the oscillatory movement of plate 42 suitably spaced in time from the zero-order peak and signalled as to arrival by the delivery of an electric pulse, which electric pulse output is thus synchronized in time with the cyclic movement of plate 42.

Typical electrical apparatus for carrying out the method of this invention is shown somewhat diagramatically in FIGS. 6A and 6B, both of which employ conventional pulse-type on-off counters for effecting elapsed time measurement between a zero-order peak and a reference point, but the latter of which dispenses with a clock pulse generator as the time base provider. The first embodiment to be described employs a single, relatively broad-spectrum radiation source 16' whereas the other embodiment utilizes a broad-spectrum source 16'' in conjunction with a monochromatic source 47, both operating in the radiation transmissive mode, i.e., with the specimen in examination interposed between the source and the interferometer.

Thus, referring to FIG. 6A, the interferometer indicated generally at 26' can be identical with that detailed in FIG. 2, including a photosensitive detector (not shown) as integral component. The detector generates a continuous fluctuating voltage signal, such as that shown in FIG. 3, which contains distinctive voltage spikes p and $g_1$, $g_2$ characteristic of the central peak and each side-band peak, respectively, as hereinbefore described. To render the response insensitive to the noise and spurious signal readout occupying the interval between successive peaks, resort is had to a conventional pulse-height discriminator 48, the output of which is limited strictly to pulses of magnitude inclusive of p and $g_1$, $g_2$, with all else barred. Under these circumstances, either pair of the pulses p, $g_1$ or p, $g_2$ can be employed for measurement of the time interval Δt, FIG. 3, because p is a fixed reference point from which the separation of either sideband peak can be precisely established.

The art of pulse interval measurement is well-advanced, as is described in "Instruments and Control Systems," pp. 125–128, September 1962 issue, published by The Instruments Publishing Company, and requires only an on-off pulse counter, such as that indicated generally at 49, which embodies a continuously operating clock-pulse generator 50 (typically, a one Mc. oscillator), delivering a constant frequency pulse output 51, which is thereafter selectively gated by AND gate 52, so that there is passed to counter 54 a regular pulse train 53 only during the preselected scanning span interval p-to-$g_1$ or p-to-$g_2$ upon which time interval measurement is based. Thus, there is ANDED in gate 52 an Input Trigger Channel 56 actuated exclusively by the counter start signal, which can be either the sensed preception of p or $g_1$ or $g_2$ as desired, although the reference point $p$ is usually preferred because of its fixed location in time. The circuit is completed by an identical Input Trigger Channel 57, reserved to counter stop signal input, which is actuated exclusively by the other zero-order peak of the pair chosen for measurement. Time is then indicated by the registration accumulated in decimal counting units 58 and, if desired, a record printed out, as is standard practice.

The apparatus detailed in FIG. 6B is, in many respects, similar to that of FIG. 6A, except that the time base provider is now a monochromatic source 47, typically a green colored visible light type emitting radiation of about 5000 A. wave length. This radiation is superimposed on the radiation from broad-band source 16″ by employment of a transmitting-reflecting mirror 60, so that two distinctive radiation inputs pass to interferometer 26″, that received from source 16″ providing the zero-order peaks $p$ and $g_1$, $g_2$ already described, whereas that from source 47 affords a constant (and relatively high) frequency interference fringe development during the cyclic span traverse of the interferometer. For example, a 5000 A. source 47 was employed in conjunction with a 60 c.p.s. interferometer sweep frequency and a 15 mil sweep span of travel of mirror 30. The central peak-to-side-band-peak spacing for a 10 mil thick film is such that approximately 760 interference fringes are developed from the particular source 47 used, thereby affording a convenient time base. This, of course, occurs simultaneously with the development of the zero-order peaks $p$, $g_1$ and $g_2$ based on radiation from source 16″ viewing the film as hereinbefore described.

It is practicable, then, to use a conventional pulse filter 61 as a diverter of the high frequency component of interferometer output to AND gate 52′, identical with gate 52 of FIG. 6A, providing a constant frequency time base substitute for clock-pulse generator 50, whereas the zero-order peak pulse signal informative of film gage passes on to pulse-height discriminator 48′ and thence to a start signal input trigger channel 56′ and a stop signal input channel 57′ (neither detailed) identical with the corresponding components of FIG. 6A. Again, the time interval duration is registered in on-off counter 54′, exactly as taught for FIG. 6A.

A particularly useful embodiment of this invention, especially suited to on-the-fly gage control by human intervention in a film manufacturing plant, is that shown in FIGS. 7A and 7B. Here it is desirable to continuously indicate visually the variation of film away from nominal processing thickness, so that the operator can take immediate corrective steps or, alternatively, monitor the process in terms of sensed gage variation over a considerable period of time, all as his experience and the specification requirements dictate.

The optical portion of the apparatus is represented schematically within broken-line box 65, whereas the associated electrical assemblage is shown within box 66. The general arrangement is similar to that already described for FIG. 1, with the running film 10′, trained about rolls 11′ and 12′, being viewed in the reflection mode from the right. Again, radiation source 16‴ can be a tungsten filament incandescent bulb, operated by D.C. current from a power source not shown, emitting radiation in the wave length range from 1–3 microns. Reflecting-transmitting mirror 67, oriented at an angle of 45° with respect to film 10′, is employed to direct source radiation to the film and thereafter receive reflected radiation therefrom, which is then passed to an interferometer of the same type as that shown in FIG. 2, incorporating a fixed mirror 31′ and a reciprocatory mirror 30′, between which is interposed a reflecting-transmitting mirror type beam splitter 32′ which directs the radiation output to photosensitive radiation detector 33′, typically a lead sulfide photocell which possesses a maximum gain in the 1–3 micron region.

Mirror 30′ is driven in reciprocal saw-tooth mode, 68, as hereinbefore described for the apparatus of FIG. 2, employing a conventional saw-tooth oscillator 70 with associated amplifier 71 as the power source for the conventional electrodynamic motor 72, similar in construction to the voice-coil and magnet structure of a cone-type loudspeaker, which motor has its shaft direct-connected to mirror 30′.

The output voltage signal from radiation detector 33′ is passed to preamplifier 75, which can be of the type detailed in FIG. 15.1 and pages 197–198 of "Transistor Circuit Design," published by Texas Instruments, Inc. The amplified voltage output then goes to conventional attenuator 76, which can be of the T-type with 6K ohm characteristic impedance, so as to determine the current drive into the following post amplifier 77 with a constant input voltage. Attenuator 76 can have the circuit shown generally in FIG. 4.13(b), page 123, "Millimicrosecond Pulse Techniques," by Lewis and Wells, publishers McGraw-Hill Book Company, whereas post amplifier 77 is preferably a fixed-gain operational amplifier of the type shown in FIG. 14.1, page 193, "Transistor Circuit Design" supra.

The output next passes into voltage doubler 78, which can have the design shown in FIG. 13-9, described at pages 280-1, "Electron Tube Circuits" by Samuel Seely, publishers McGraw-Hill Book Company, thereby providing a trigger signal of waveform III, FIG. 7B, applicable to bistable multivibrator 79, which can be of the two-transistor D.-C. cross-coupled flip-flop type shown in FIG. 6–5, page 101, "Transistor Circuit Handbook" by L. E. Garner, published by Coyne Company. An indicating meter 80 is connected between the two collectors of multivibrator 79, to give spot indication of film thickness, whereas a gage recorder 81 is connected in parallel from multivibrator 79 to give a continuous record of film gage versus time. Finally, there is provided a wave form alternation connection 83 running from oscillator 70 to multivibrator 79, in circuit with the latter so as to alternate it from one stable state to the other, as depicted by waveform II, FIG. 7B, responsive to flyback of the oscillator output, indicated as waveform I.

The embodiment of FIGS. 7A–7B was devised to detect gage variation from nominal thickness within a preselected tolerance range and, accordingly, it is advantageous to introduce a zero offset, dependent on the nominal film thickness being worked with, in other to limit the relative movement of mirror 30′ with respect to mirror 31′, to thereby operate with a restricted span of reduced path length, preferably only that region inclusive of the applicable tolerance limits. The investigatory range is thus quite closely confined to the region of allowable film thickness variation only, without incurring the possibility of any extraneous interference foreign to this region and, at the same time, limiting the investigation to the matter of primary concern, and that only, namely, the distance separating the two film faces.

The appropriate offset can be readily obtained by either altering the fixed mirror 31′ mounting an exact distance shortening the path from beam splitter 32′ to it in order to match the critical distance reached in the path of travel taken by mirror 30′ during its reciprocatory travel or, alternatively, the mounting of the latter can be shifted, as by a micrometer screw adjustment, in order to achieve the same objective. Thus, while the primary reference still remains the central zero peak as already described with reference to FIGS. 1–4, there is no need to actually traverse that peak in the cyclic scanning so long as the amount of offset deliberately introduced into the mirror 30′, 31′ placement is known and taken account of.

In operation, a given side-band peak is preselected as the guide-on, so that the radiation input from beam splitter 32′ to photosensitive detector 33′ carries with it a characteristic side-band zero-order peak resulting from constructive interference, as hereinbefore described.

Typically, for the monitoring of film thicknesses up to about 12 mils, mirror 30' reciprocates at scan rates from about 10 to 160 cycles per second over travels ranging, respectively, from only 2.5 mils to 0.15 mil, depending upon the tolerance which is to be maintained. The higher the frequency of the scan rate, the greater the number of measurements of film thickness it is possible to make during a given interval of time.

The voltage signal from detector 33' is amplified by preamplifier 75 and then passed to attenuator 76. The attenuator provides a stepped, switch-controlled, manual gain adjustment enabling operator choice of the signal level over the range of film thicknesses measured. Preferably, attenuator 76 permits signal level attenuation in the range of unity down to about 0.01.

The output signal is then post-amplified in amplifier 77, following which it is introduced into voltage doubler 78, which provides the trigger signal depicted as waveform III, FIG. 7B, applied to multivibrator 79. The time relationship of operations is best understood by consideration of FIG. 7B, which shows the several waveforms involved in common time synchronism.

Thus, waveform I is the saw-tooth voltage generated by oscillator 70, this triggering multivibrator 79 via circuit connection 83 so as to switch it, at constant frequency, from one stable state to the other at the instant of flyback, thereby providing the time base waveform II. When a trigger signal in the form of the successive spikes of waveform III is received by multivibrator 79 from voltage doubler 78, the multivibrator output is converted to waveform IV, i.e., reversal of polarity is induced as a result of receipt of a signal corresponding to the encountering of a side-band zero-order peak, so that an averaging of the top and bottom halves of waveform IV by the meter 80 connected between the two collectors of multivibrator 79 provides a reading indicative of film thickness variation from nominal thickness.

From the foregoing, and reference to FIG. 7B, it will be understood that the duration of one half cycle of waveform II constitutes the time base upon which pulse III, the index of film thickness, is superimposed, so that exact centering of perceived pulse III, as shown in FIG. 7B, confirms that actual nominal thickness is being measured. Conversely, movement of pulse III to right or left of the center point, as viewed in FIG. 7A, which center point is determined by calibration from a standard film specimen of known gage, reveals, respectively, that the film is thicker or thinner than the nominal value. Recorder 81, connected in parallel with indicating meter 80, records the running gage variance from nominal and thus enables the operator to verify the effects of any corrective measures he may take responsive to spot readings had on meter 80.

In practice it is often desirable to traverse the film to obtain a thickness profile across the entire width. This is readily accomplished with the apparatus of this invention by mounting the optical apparatus 65, FIG. 7A, within a compact scanning head on the end of a reciprocatory-driven telescopic boom, effecting connection to the electrical components 66 via a flexible cable. In a typical example, polyester film ranging in thickness from 0.1 mil to 12 mils in the various grades produced was the product. Moderate haze in the film affected the transparency, so that the radiation transmission was in the range of approximately 30% to 100%. The running film speed was 50 ft./min., with the usual film width in excess of 3 ft. Operating in the reflection mode with normal light incidence on the film, a vertical film flutter movement of as much as 6–8" in a 12 ft. width could be tolerated without noticeable effect on film thickness measurement.

With a clearance between the optical head and the film of 18", the radiation inspection spot measured about ¼" x ¼". A single traverse of the gage across a 10 ft. width of film required, typically, approximately 3 mins., giving a profile of film thickness extending over a diagonal path of length dependent on film speed. The results obtained were very satisfactory and the apparatus proved to be a valuable aid to manufacturing control.

Referring back to Equation 5 hereinbefore set forth, time interval $\Delta t$ is seen to be a function of refractive index $n$ as well as length of path $d$, so that this invention also affords a means for measuring refractive index as well.

A preferred apparatus for the accomplishment of this is portrayed somewhat schematically in FIG. 8. Here the sample 86, of thickness $d$, can be a running film, a flowing liquid sample or any other physical form of material reflecting radiation from its surfaces as hereinafter described.

The optical arrangement employed is similar to that shown in FIG. 1, except that two interferometric examinations are here made simultaneously, one being normal to the sample, as to which the radiation course is indicated in full-line representation in FIG. 8, whereas the other is at an angle $\theta$ to the normal, which radiation course is shown in broken-line representation. This is conveniently accomplished by use of a common source 87 employing focusing lenses 18' and 18", the former of which directs radiation to beam splitter 90, which reflects essentially all of it along course 92 perpendicular to the sample surface, whereas the latter directs radiation at an angle of typically 45° thereto, shown as course line 85. A portion of the normal radiation is reflected back through beam splitter 90 from both the front and rear surfaces of sample 86, and thence to interferometer 91, which can be identical in design with that already taught with respect to FIG. 2. The radiation impinging angularly of sample 86 is reflected from the front surface along a course 88, whereas a portion is refracted internally of the sample along a course making an angle of $\theta_1$ with the normal, to thereafter be reflected from the rear surface and thence leave the sample along course 89. Both of these radiation components are reflected via mirror 93 to beam splitter 90, and thence to interferometer 91.

From the foregoing, it will be understood that there are four separate wave trains available for development of zero-order peaks, the central peak $p'$, FIG. 9, resulting from constructive interference between all four wave trains when the reciprocatory mirror of interferometer 91 arrives at a point in its travel wherein the two interferometer arms are exactly equal. On the other hand, as the reciprocatory mirror moves farther in its reciprocation, side-band zero-order peaks result from constructive interference occurring sequentially as regards radiation impinging normally of the sample along course line 92, i.e., $h_1$, and as regards radiation impinging angularly of the sample along course line 85, i.e., $h_2$. Side-band zero-order peaks $h_1$ and $h_2$ are spaced apart 1–1.5% of the extreme central peak-to-side-band peak span, but are distinctive enough to permit ready measurement of the time intervals $\Delta t_1$ and $\Delta t_2$ upon which refractive index measurement can be predicated.

Thus, by Equation 5 hereinbefore set forth, $\Delta t_1 = K(2nd) \cos \theta_1$, where $K = T/B$, but, since $\theta_1$ for radiation of normal incidence is zero degrees, $\cos \theta_1 = 1$, and, therefore, $\Delta t_1 = K(2nd)$. Similarly, $\Delta t_2 = K(2nd) \cos \theta_1$; however, $\theta_1$ in this case is the angle of refraction shown in FIG. 8, which is greater than zero for the angularly incident radiation. Combining the equations, $\Delta t_2 = \Delta t_1 \cos \theta_1$, or $\cos \theta_1 = \Delta t_2 / \Delta t_1$, and this ratio of the two applicable time measurements can be easily obtained by conventional voltage analog means.

By Snell's Law, $\sin \theta_1 = \sin \theta / n$, where $n$ = refractive index. Using the trigonometric relationship $$\sin^2 \theta_1 + \cos^2 \theta_1 = 1$$

and substituting $\sin \theta / n$ for $\sin \theta_1$, the equation $$n \cos \theta_1 = \sqrt{n^2 - \sin^2 \theta}$$

results, whereupon, $\sin \theta$ being known and $\cos \theta_1$ being determined as the time interval $\Delta t_2 / \Delta t_1$ ratio, the refractive index can be computed.

Many polymeric materials display the property of birefringence in varying degrees, depending upon the extent of molecular orientation which exists within the crystals. Thus, each crystal will possess three distinctive refractive indices $n_x$, $n_y$ and $n_z$, orthogonally related to each other. Birefringence in the length $(x)$–width $(y)$ plane for thin sheets is then defined as $|n_x-n_y|$. If a film exhibiting birefringence is examined with normally incident radiation in exactly the same manner as hereinbefore taught for film gage measurement, twin side-band peaks $k_1$ and $k_2$ are obtained, as shown in FIG. 10. Again, the time intervals $\Delta t_1$ and $\Delta t_2$ found to exist in scanning from central peak $p''$ to side-band peaks $k_1$ and $k_2$, respectively, can be measured. In operation, as will be clear from the discussion of Equation 5 as applied to normal incidence examinations for the determination of refractive index hereinbefore set forth, optical thickness, defined as the product of a given refractive index $n$ and film thickness $d$, is related to the time interval $\Delta t$ by a common constant $K'$, so that, as a generality, $\Delta t = K'nd$.

Then, $\Delta t_2' - \Delta t_1' = K'n_x d - K'n_y d$. If the latter expression is divided by the product of $K'$ times an average thickness $d_{(ave)}$, one obtains birefringence, that is:

$$\left| \frac{K'n_x d - K'n_y d}{K'd_{(ave)}} \right| = |n_x - n_y|$$

The average thickness, $d_{(ave)}$, employed here is not particularly critical to the calculation, as long as it is generally within the range of values measured in the gage monitoring already described. Conveniently, the film gage can be measured simultaneously with the birefringence, the same side-band $k_1$ and $k_2$ peaks being employed as indicia, and thickness being then taken as the average based upon a time interval immediate $\Delta t_1'$ and $\Delta t_2'$, if extreme accuracy is desired.

Various other properties, such as the presence of particular substances in the product and many other factors, are often accompanied by characteristic radiation interference effects which can be measured and correlated with the causative agency, provided their effects can be isolated, through the use of this invention, and it is, accordingly, intended to be limited only by the scope of the following claims:

I claim:

1. A method for determining a physical property of a specimen on the basis of interferometric optical phase discrimination comprising, in sequence, directing analytical radiation upon said specimen along a course such that there is developed an optical phase difference between radiation emanating from a first radiation-reflective surface of said specimen and from a second radiation-reflective surface of said specimen, cyclically varying at a predetermined time rate the length of the path of travel of said radiation emanating from a given one of the pair consisting of said first radiation-reflective surface of said specimen and said second radiation-reflective surface of said specimen, with respect to the length of the path of travel of the radiation emanating from the other of said pair over a span inclusive of a zero-order peak at which there exists constructive interference between said radiation emanating from said first radiation-reflective surface of said specimen and from said second radiation-reflective surface of said specimen, measuring the elapsed time existing between the scan traverse of said zero-order peak at which there exists said constructive interference and a preselected reference point synchronized in time with the cycle of said scan traverse, said preselected reference point being originally established in location by scanning said specimen through a span inclusive of a central zero-order peak, and determining said physical property of said specimen as a function of said elapsed time.

2. A method of determining a physical property of a specimen on the basis of interferometric optical phase discrimination according to claim 1 wherein said preselected reference point is a second zero-order peak at which there exists constructive interference between said radiation emanating from both said first radiation-reflective surface of said specimen and from said second radiation-reflective surface of said specimen individually.

3. A method of determining the thickness of a radiation-transmissive film on the basis of interferometric optical phase discrimination according to claim 1 wherein said first radiation-reflective surface is one external face of said film and said second radiation-reflective surface is the other external face of said film.

4. A method of determining a physical property of a specimen on the basis of interferometric optical phase discrimination according to claim 1 wherein the length of said path of travel of said radiation emanating from said given one of said pair consisting of said first radiation-reflective surface of said specimen and said second radiation-reflective surface of said specimen is cyclically varied at a substantially constant time rate whereas said path of travel of said radiation emanating from the other of said pair is maintained fixed in length.

5. Apparatus for determining a physical property of a specimen on the basis of interferometric optical phase discrimination comprising, in combination, a source directing radiation upon said specimen of a wavelength adapted to develop an optical phase difference between radiation emanating from a first radiation-reflective surface of said specimen and from a second radiation-reflective surface of said specimen, means cyclically varying at a predetermined time rate the length of the path of travel of said radiation emanating from a given one of the pair consisting of said first radiation-reflective surface of said specimen and said second radiation-reflective surface of said specimen with respect to the length of the path of travel of the radiation emanating from the other of said pair over a span inclusive of a zero-order peak at which there exists constructive interference between said radiation emanating from said first radiation-reflective surface of said specimen and from said second radiation-reflective surface of said specimen, means sensing the occurrence of said zero-order peak, means measuring the elapsed time existing between the scan traverse of said zero-order peak and a preselected reference point synchronized in time with the cycle of said scan traverse, said preselected reference point being originally established in location by scanning said specimen throughout a span inclusive of a central zero-order peak, and means indicating said physical property of said specimen as a function of said elapsed time.

6. Apparatus for measuring a physical property of a specimen on the basis of interferometric optical phase discrimination according to claim 5 wherein said means cyclically varying at a predetermined time rate the length of the path of travel of said radiation emanating from a given one of the pair consisting of said first radiation-reflective surface of said specimen and said second radiation-reflective surface of said specimen with respect to the length of the path of travel of the radiation emanating from the other of said pair consists of a Michelson-type interferometer having one of its mirrors fixed and the other mirror provided with reciprocatory drive means moving said last-mentioned mirror over said span inclusive of a zero-order peak at which there exists constructive interence between said radiation emanating from said first radiation-reflective surface of said specimen and from said second radiation-reflective surface of said specimen.

7. Apparatus for measuring a physical property of a specimen on the basis of interferometric optical phase discrimination according to claim 5 wherein said means measuring said elapsed time existing between said scan traverse of said zero-order peak at which there exists said constructive interference and said preselected reference point synchronized in time with the cycle of said scan traverse consists of an electrical pulse counter operating responsive to a pulse source generating electrical pulses at a time rate high in comparison with the time required for said scan traverse, provided with switching means starting counting by said counter at the sensing of said preselected reference point and halting said counting at the sensing of said zero-order peak.

References Cited by the Examiner

UNITED STATES PATENTS

| | | | |
|---|---|---|---|
| 2,518,647 | 8/1950 | Teeple et al. | 88—14 |
| 3,202,052 | 8/1965 | Rambauske et al. | 88—14 X |
| 3,238,839 | 3/1966 | Day | 88—14 |

JEWELL H. PEDERSEN, *Primary Examiner.*

JOHN K. CORBIN, *Examiner.*

UNITED STATES PATENT OFFICE
CERTIFICATE OF CORRECTION

Patent No. 3,319,515                                           May 16, 1967

Philip A. Flournoy

It is hereby certified that error appears in the above numbered patent requiring correction and that the said Letters Patent should read as corrected below.

Column 1, line 30, for "by refrin-" read -- birefrin- --; column 5, line 58, after "30" insert -- movement --; column 10, line 71, the equation should appear as shown below instead of as in the patent:

$$n \cos \theta_1 = \sqrt{n^2 - \sin^2 \theta}$$

column 11, line 69, for "through" read -- throughout --;
column 12, line 66, for "interence" read -- interference --.

Signed and sealed this 9th day of January 1968.

(SEAL)
Attest:

EDWARD M. FLETCHER, JR.                            EDWARD J. BRENNER
Attesting Officer                                      Commissioner of Patents